Jan. 4, 1966       M. LECHEVALLIER       3,227,624
CONTROL ROD FOR NUCLEAR REACTORS
Filed Nov. 12, 1963

INVENTOR.
MAURICE LECHEVALLIER
BY
Bacon & Thomas
ATTORNEYS

United States Patent Office 3,227,624
Patented Jan. 4, 1966

3,227,624
CONTROL ROD FOR NUCLEAR REACTORS
Maurice Lechevallier, Viry-Chatillon, France, assignor to Groupement Atomique Alsacienne Atlantique, Le Plessis-Robinson (Seine), France
Filed Nov. 12, 1963, Ser. No. 322,727
Claims priority, application France, Nov. 12, 1962, 915,119
6 Claims. (Cl. 176—86)

The present invention relates to a control rod for nuclear reactors, said control rod being essentially composed of a plurality of nested elements which are capable of sliding one inside the other.

It is known that the control rods of a nuclear reactor are fabricated of a neutron-absorbing material which is surrounded by a sheath or jacket and that said rods are called upon to serve three purposes, namely, fine control, coarse control and safety control. The fine-control or so-called "fine" rods permit the possibility of changing the power level of the reaction by modifying the absorption of neutron flux by the material which constitutes the rod. The action of the coarse-control or so-called "shim" rods is superimposed on that of the "fine" rods. Insofar as concerns the so-called "safety" rods, these latter are kept completely out of the reactor under normal operating conditions. Should an emergency arise, or in other words, should the neutron flux emitted in the reactor core increase beyond the design safety limits, the safety rods must accordingly be inserted into the reactor core at great speed in order to permit the neutron level to be restored to a value which no longer presents any danger.

In view of the mass which has to be displaced over a very short time, the positioning of the safety rods after these latter have been released from the ready position and dropped into the reactor core is accompanied by two difficulties:

(1) The initiation of the rod motion, which can be effected by the expansion of a gas or of a spring or merely by dropping under gravity if the rod motion is carried out vertically downwards.

(2) The damping or softening of the impact when the aforesaid mass comes to a stop within the reactor core, which it is the object of the present invention to provide.

The present applicant has accordingly had the idea of damping the downward motion of the safety rods as they are dropped into the core of a nuclear reactor by constructing each rod of a number of nested elements which are adapted to slide one inside the other. In accordance with a particularly advantageous form of embodiment of the invention, said rod is made up of so-called "telescopic" elements which cannot be separated from each other.

The control rods in accordance with the invention, which will be designated hereinafter as "telescopic rods," are secured in the ready position by any known means, for example by means of a steel rope. In the event of emergency, the rods are released so as to permit of either a free fall or accelerated fall until they come into contact either with an end-of-travel stop or other impact device which is designed to prevent further motion.

The different elements which can be nested so as to form the "telescopic rod" are adapted to slide one inside the other until they come into individual abutment, thereby permitting the progressive abutment of the rod with the stop which is provided for the combined assembly.

As the number of elements constituting the rod is greater, so the shocks which absorb the kinetic energy of said rod are both more numerous and correspondingly smaller. Accordingly, the parts which are subjected to such shocks are capable of withstanding these latter without apparent deformation and without any need to make provision for any dynamic braking system.

There have been described hereinafter and illustrated in the accompanying drawings two possible forms of embodiment of the control rod in accordance with the invention, although other forms of embodiment could be devised without thereby departing from the scope of this invention.

The rod in accordance with the invention as illustrated in the accompanying drawings is composed of a series of annular elements 1, 2, 3 . . . which cannot be disengaged and which are assembled in a so-called "telescopic" fit. Each element 1 is adapted to slide within two elements 2 and 3 by which said element 1 is immediately surrounded and so on in the same sequence along the rod. The continuity of the sheath or jacket which is thus formed cannot be broken in the position of maximum extension by virtue, for example, of shouldered portions which are formed in two juxtaposed elements and which co-operate in said position (namely, the shouldered portions $1b$, $2a$ in the case of the elements 1, 2 in FIG. 1). The elements which constitute the rod can of course be endowed with any suitable shape or section without thereby departing from the scope of the invention, on the sole condition that said elements are permitted to slide one inside the other without any risk of separation.

Figure 1:
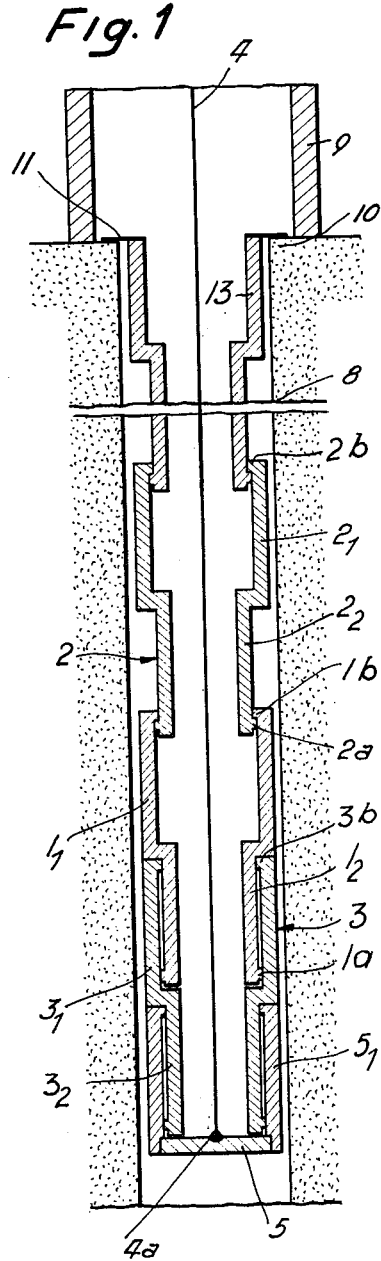
FIG. 1 illustrates in axial cross-section a control rod in accordance with the invention, said control rod being made up of so-called "telescopic" elements which cannot be disengaged and which work in extension as and when they are moved into position within the core of a nuclear reactor.
Figure 2:
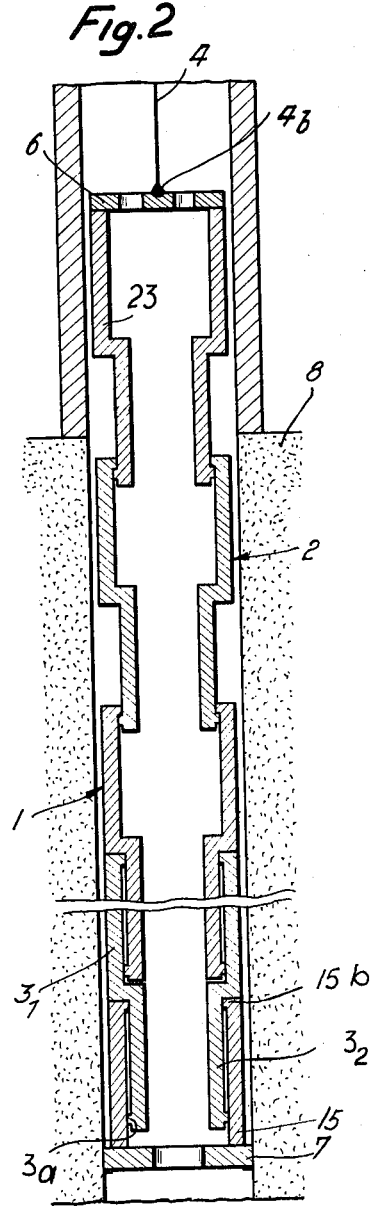
FIG. 2 illustrates an alternative form of embodiment of the same rod, the "telescopic" elements of which work in compression.

In accordance with the form of embodiment which is illustrated in FIGS. 1 and 2, each element 2, 1, 3 . . . consists of two superposed cylindrical portions having different diameters, one cylindrical portion of each of said elements having a large diameter as respectively designated by the reference $2_1$, $1_1$, $3_1$ . . ., followed by a cylindrical portion which has a small diameter as designated by the references $2_2$, $1_2$, $3_2$ . . .. These diameters are chosen in such manner that each cylindrical portion of element which has a smaller diameter as designated by the references $2_2$, $1_2$ is capable of sliding easily within each cylindrical portion of large diameter of the following element, as respectively designated by the references $1_1$, $3_1$.

Each cylindrical portion $2_2$, $1_2$, $3_2$ . . . is provided at its extremity with an external flange $2a$, $1a$, $3a$ respectively which is designated to fit inside the adjacent element and which is also intended to be held inside the corresponding cylindrical portion $1_1$, $3_1$ . . . , irrespective of the positions of the elements 2, 1, 3 relatively to each other, by means of an internal annular shoulder $2b$, $1b$, $3b$ . . . which closes each cylindrical portion $2_1$, $1_1$, $3_1$ at the top thereof and above said flange $1a$, $3a$, thus preventing any separation of the elements.

The two cylindrical portions $1_1$ and $1_2$, $2_1$ and $2_2$ . . ., of the different elements have preferably the same length so as to permit of the maximum engagement of said elements relatively to each other and consequently a maximum reduction in length of the rod.

The combined assembly of the aforesaid elements as thus carried by each other is suspended by a steel rope 4. It can be seen from FIG. 1 that the rope 4 is secured at 4a to a base-plate 5 provided at the extremity of the rod, said base-plate 5 being made integral with a ring $5_1$ which is adapated to slide over the ring or cylindrical portion $3_2$ of the last element 3.

At the other end, the first element 13 is provided at the top with a flange 11 which is fixed, for example, by welding and which serves as a stop for the purpose of limiting the fall of the complete unit.

The rod in accordance with the invention as thus constructed is placed in known manner within a nuclear reactor inside a channel 8–9, the portion 8 of said channel corresponding substantially to the core of said reactor whilst the channel 9 contains the rod when this latter is not in service.

The elements 1, 2 . . . forming the rod which is illustrated in FIG. 1 are intended to work in extension when the rod is lowered into the core channel 8. The channel 8 has a shoulder 10 which is intended to cooperate with the flange 11, said flange being integral with the head of the rod and serving as a stop-plate.

The operation of the device of FIG. 1 is as follows. When the rod is in service, it is suspended by the steel ropes 4 within the channel 9 and the base-plate 5 is located substantially at the level of the shoulder 10, all the telescopic elements being thus fitted one inside the other and the rod compressed to its minimum length. In the event of a fault condition occurring, the suspension rope 4 is released instantaneously and the so-called "safety rod" falls under the action of its own weight into the core channel 8. At the end of travel of the rod, the flange 11 comes into contact with the shoulder 10, which has the effect of securing the rod head against further motion. Each element 1, 2 . . . which forms the rod accordingly slides over the adjacent elements, thereby producing the extension of said rod and the damping of the positioning movement thereof inside the reactor core. By virtue of the contact of the flange 11 with the shoulder 10, the rod is secured in the service position and extended to its maximum useful length.

In accordance with the alternative form of embodiment which is illustrated in FIG. 2, the rod is also provided with annular elements 1, 2, 3 which are slidably fitted relatively to each other but which work in compression when the rod is positioned in the reactor core. The top element 23 is provided with a head 6 to which is secured at 4b the steel rope 4 by which the rod is suspended.

The last element 3 carries an abutment ring 15 which is adapted to slide over the cylindrical portion $33_2$ and which is fitted over the flange 33a of this latter by means of an annular shoulder 15b and the core channel 8 is provided with a base 7 designed to receive said ring 15 and to arrest the downward motion of the entire rod unit.

The rod which is suspended in the top position by the steel rope 4 within the channel 9 is released as and when requirements dictate. The said rod moves until the sliding ring 15 comes into contact with the stationary end-of-travel stop 7. Each element 1, 2 . . . then slides over the adjacent elements, thereby producing the compression of the rod and the softening of the impact against the stop 7.

In the two forms of embodiment hereinafter described, the operation as a fine rod or slim rod would be analogous to the "safety-rod" operation the rope 4 being either released or raised progressively over the requisite distance and the elements being engaged either to a greater or lesser extent according to requirements.

Each of the annular elements preferably contains a neutron-absorbing material, but it is also possible to construct a rod consisting of telescopic elements which cannot be disengaged, without neutron absorber. Use is made in this case of absorber rings which are easier to fabricate and which are attached with more or less freedom to each element.

The above method facilitates the fabrication of the rod.

The present invention is not limited to the forms of embodiment hereinbefore described. Alternative forms can be devised without thereby departing from the scope or the spirit of the invention. In particular, it would be possible to endow the "telescopic" elements with any suitable shape or section and to adopt any suitable system for arresting the movement of the rod.

What I claim is:

1. A control rod for nuclear reactors, comprising: a plurality of telescopically assembled annular elements; a member for controlling the sliding movement of said elements relative to each other and for suspending the combined assembly of said elements for vertical movement between an inoperative position wherein said assembly is completely withdrawn from the core channel of a nuclear reactor and an operative position wherein said assembly is positioned in the interior of the reactor core; and means securing the suspension member to one of the elements forming the end element of said assembly, each of said annular elements including a first cylindrical portion having a diameter smaller than and freely slidable in said core channel and a second cylindrical portion having a diameter which telescopically fits inside the first cylindrical portion of the adjacent element; the respective diameters of said first and said second portion of each of said assembled elements being substantially uniform; an outwardly formed flange on the outer end of each of said second cylindrical portions having an outer diameter slightly smaller than and freely slidable within the inner wall of the respective first cylindrical portion; and an inwardly formed shoulder on the outer end of each of said first cylindrical portions having an inner diameter slightly greater than and freely slidable on the outer wall of the second portion of the respective adjacent element, said flange and shoulder of each of said telescoping elements abutting upon extension of said telescoping elements for suspending each of said elements from the adjacent element directly thereabove.

2. A control rod for nuclear reactors as claimed in claim 1 in which said first cylindrical portion and said second cylindrical portion of each of said telescoping elements are of substantially the same length.

3. A control rod for nuclear reactors as claimed in claim 1 in which said one end element is the uppermost of said assembly of elements and said means securing the suspension member to said one end element includes a head rigid with the upper end of said one end element, said suspension member being secured to said head; and an abutment member is mounted on the lower end of the lowermost of said elements for abutting the inner end of the core channel and arresting the vertical movement of the combined assembly.

4. A control rod for nuclear reactors as claimed in claim 1 wherein the lowermost element of said assembly of elements includes only said first cylindrical portion having an inwardly formed shoulder on the upper end thereof slidable on the outer wall of the second portion of the element disposed immediately thereabove, and a flange is rigid with the lower end of said lowermost element.

5. A control rod for nuclear reactors as claimed in claim 1 in which said one end element is the lowermost of said assembly of elements, said means securing the suspension member to said one end element includes a base plate rigid with the lower end of said one element, and said suspension member extends through the interior of said assembly and is secured to said base plate, and wherein a stop plate having a diameter greater than the diameter of the opening of said core channel is rigid with the upper end of the uppermost of said assembly of elements, said stop plate abutting the lateral wall at the entrance of said core channel when said control rod is in said operative position whereby, when said stop plate is abutting the lateral wall at the core channel entrance, sliding movement of said elements relative to each other, resulting in varying the effective length of the control rod, may be effected by vertical movement of said suspension member.

6. A control rod for nuclear reactors as claimed in claim 1 in which said one end element is the uppermost of said assembly of elements, and a flange is rigid with the lower end of the lowermost of said elements for abutting the inner end of the core channel when said control rod is disposed in the operative position whereby, when said flange is abutting the inner end of the core channel, sliding movement of said elements relative to each other, resulting in varying the effective length on the control rod, may be effected by vertical movement of said suspension member.

References Cited by the Examiner
UNITED STATES PATENTS

| | | | |
|---|---|---|---|
| 2,852,458 | 9/1958 | Dietrich et al. | 176—86 |
| 2,987,455 | 6/1961 | Huston et al. | 176—86 |

FOREIGN PATENTS 164,164  7/1958  Sweden.

LEON D. ROSDOL, *Primary Examiner.*

REUBEN EPSTEIN, CARL D. QUARFORTH,
*Examiners.*

M. R. DINNIN, L. D. RUTLEDGE, *Assistant Examiners.*